US008942224B2

(12) United States Patent
Lucky et al.

(10) Patent No.: US 8,942,224 B2
(45) Date of Patent: Jan. 27, 2015

(54) METHOD AND SYSTEM FOR HANDLING SECURITY SYNCHRONIZATION FOR PROLONGED PERIODS OF NO-RECEPTION OF VOICE FRAMES

(75) Inventors: Kundan Kumar Lucky, Bangalore (IN); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 13/389,076

(22) PCT Filed: Aug. 23, 2010

(86) PCT No.: PCT/KR2010/005590
§ 371 (c)(1),
(2), (4) Date: Feb. 6, 2012

(87) PCT Pub. No.: WO2011/021917
PCT Pub. Date: Feb. 24, 2011

(65) Prior Publication Data
US 2012/0134354 A1    May 31, 2012

(30) Foreign Application Priority Data

Aug. 21, 2009    (IN) ........................... 1999/CHE/2009

(51) Int. Cl.
*H04J 3/06* (2006.01)
*H04H 20/71* (2008.01)
(Continued)

(52) U.S. Cl.
CPC ............. *H04L 1/0046* (2013.01); *H04L 9/12* (2013.01)
USPC ............ 370/350; 370/312; 370/394; 380/247

(58) Field of Classification Search
CPC .................................................. H04W 56/00
USPC ..................... 370/350, 312, 394; 380/247
See application file for complete search history.

(56) References Cited

U.S. PATENT DOCUMENTS

2005/0141443 A1* 6/2005 Kim et al. ...................... 370/312
2005/0243831 A1* 11/2005 Zhang et al. .................. 370/394
2007/0258591 A1* 11/2007 Terry et al. .................... 380/247
(Continued)

FOREIGN PATENT DOCUMENTS

| CN | 101444012 A | 5/2009 |
| TW | 200803371 A | 1/2008 |
| WO | 2006/104346 A1 | 10/2006 |

OTHER PUBLICATIONS

3GPP Technical Specification (TS) 25.322, V7.0.0, Mar. 2006, chapter 4.2.
Kreher, Ralf, et. al., UMTS Signaling, 2nd Edition, Wiley, 2007, chapter 1.13.

*Primary Examiner* — Kiet Tang
(74) *Attorney, Agent, or Firm* — Jefferson IP Law, LLP

(57) ABSTRACT

A method and system for handling security synchronization for prolonged periods of no-reception of voice frames. The method includes receiving one or more protocol data units (PDUs) by a radio link control (RLC) sub layer and determining a time period between the receiving of each PDU and a previously received PDU by the RLC sub layer. Further, the method includes initiating recovery procedure for the time period exceeding a first predefined time. The recovery procedure includes identifying count of the one or more PDUs to be recovered, deciphering each PDU using a plurality of hyper frame numbers (HFNs) and updating a master HFN based on the deciphering. The master HFN deciphers each PDU among the one or more protocol data units. Further, the method also includes delivering the one or more PDUs to a packet data convergence protocol sub layer where type verification of the PDU is performed.

20 Claims, 5 Drawing Sheets

(51) Int. Cl.
*H04L 12/28* (2006.01)
*H04K 1/00* (2006.01)
*H04L 1/00* (2006.01)
*H04L 9/12* (2006.01)

(56) References Cited

U.S. PATENT DOCUMENTS

2010/0165901 A1  7/2010  Kim

\* cited by examiner

METHOD AND SYSTEM FOR HANDLING SECURITY SYNCHRONIZATION FOR PROLONGED PERIODS OF NO-RECEPTION OF VOICE FRAMES

TECHNICAL FIELD

The present disclosure relates generally to the field of telecommunications. More particularly, the present disclosure relates to a method and system for handling security synchronization for prolonged periods of no-reception of voice frames when a voice service is mapped over unacknowledged mode of radio link control sub layer.

BACKGROUND ART

In the field of telecommunication, usually, we have multiple devices communicating through a network to exchange information in order to achieve a desired result or function. The security and accuracy of the information transmitted is of great importance and it must be maintained at optimal levels all through the period of transmission until reception. Transmitted information is secured through the process of encryption. At the receiving end, the received information is decrypted and the process of transmission is complete. Due to ambiguity of encryption however, in the existing telecommunication systems like HSPA, HSPA+ and UMTS, there is a failure in decryption for prolonged periods of no reception of data frames of information at the receiver.

A decryption key is used at the receiver end which is a combination of the hyper frame number (HFN) and a sequence number termed the RLC-SN (radio link control-sequence number). The RLC-SN is seven bits long and wraps around after the transmission of every 128 protocol data units (PDUs). At the instant of RLC-SN wraparound, the HFN is to increment. Due to ambiguity of encryption, a scenario arises wherein after prolonged periods of no reception of information, the RLC-SN wraparound takes place and the HFN is not incremented. The HFN value used is thus erroneous and the deciphering operation will fail. The user at the receiving end perceives the received information as garbled noise. A method and system is thus needed to remove the aforementioned inefficiencies.

DISCLOSURE OF INVENTION

Technical Problem

In light of the foregoing discussion there is a need for method and system for handling security synchronization for prolonged periods of no-reception of voice frames when a voice service is mapped over unacknowledged mode of radio link control sub layer.

Solution to Problem

Embodiments of the present disclosure described herein provide a method and system for handling security synchronization for prolonged periods of no-reception of voice frames.

An example of a method includes receiving one or more protocol data units by a radio link control sub layer. The method also includes determining a time period between the receiving of each protocol data unit and a previously received protocol data unit by the radio link control sub layer. The previously received protocol data unit was received immediately before the first protocol data unit among the one or more protocol data units. Similarly, for second protocol data unit received among the one or more protocol data units, the time period corresponds to the time between the receiving of the first protocol data unit and the second protocol data unit by the radio link control sub layer. Further, the method also includes initiating recovery procedure for the time period exceeding a first predefined time. The recovery procedure includes identifying count of the one or more protocol data units to be recovered. The recovery procedure also includes deciphering each protocol data unit among the one or more protocol data units using a plurality of hyper frame numbers. Further, the recovery procedure includes updating a master hyper frame number based on the deciphering. The master hyper frame number deciphers each protocol data unit among the one or more protocol data units. Further, the method also includes delivering the one or more protocol data units to a packet data convergence protocol sub layer. Furthermore, a type verification of the protocol data unit is performed.

An example of a system includes a plurality of electronic devices. The plurality of the electronic devices includes a communication interface for receiving one or more protocol data units. The plurality of the electronic devices also include a processor in electronic communication with the communication interface to determine a time period between the receiving of each protocol data unit and a previously received protocol data unit by the radio link control sub layer. Similarly, for second protocol data unit received among the one or more protocol data units, the time period corresponds to the time between the receiving of the first protocol data unit and the second protocol data unit by the radio link control sub layer. The previously received protocol data unit was received immediately before the first protocol data unit among the one or more protocol data units. The processor also initiates recovery procedure for the time period exceeding a first predefined time. The recovery procedure includes identifying count of the one or more protocol data units to be recovered. The recovery procedure also includes deciphering each protocol data unit among the one or more protocol data units using a plurality of hyper frame numbers. Further, the recovery procedure includes updating a master hyper frame number based on the deciphering. Further, the processor delivers the one or more protocol data units to a packet data convergence protocol sub layer. Here, a type verification of the protocol data unit is performed. The system also includes a network. The network includes a communication interface for receiving one or more protocol data units. The network also include a processor in electronic communication with the communication interface to determine a time period between the receiving of each protocol data unit and a previously received protocol data unit by the radio link control sub layer. Similarly, for second protocol data unit received among the one or more protocol data units, the time period corresponds to the time between the receiving of the first protocol data unit and the second protocol data unit by the radio link control sub layer. The processor also initiates recovery procedure for the time period exceeding a first predefined time. The recovery procedure includes identifying count of the one or more protocol data units to be recovered. The recovery procedure also includes deciphering each protocol data unit among the one or more protocol data units using a plurality of hyper frame numbers. Further, the recovery procedure includes updating a master hyper frame number based on the deciphering. Further, the processor delivers the one or more protocol data units to a packet data convergence protocol sub layer. Here, a type verification of the protocol data unit is performed.

Advantageous Effects of Invention

The present invention enables to handle security synchronization for prolonged periods of no-reception of voice frames when a voice service is mapped over unacknowledged mode of radio link control sub layer.

BRIEF DESCRIPTION OF DRAWINGS

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

MODE FOR THE INVENTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for handling security synchronization for prolonged periods of no-reception of voice frames.

Figure 1:
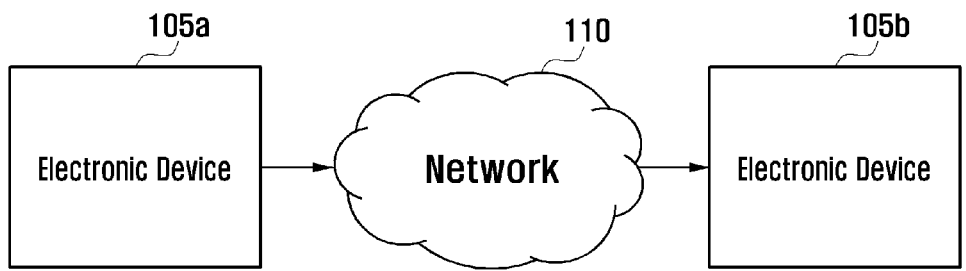
FIG. 1 is a block diagram of an environment, in accordance with which various embodiments can be implemented.

FIG. 1 is a block diagram of an environment 100, in accordance with which various embodiments can be implemented.

The environment 100 includes a plurality of electronic devices, for example an electronic device 105a and an electronic device 105b. The electronic device 105a coupled to another electronic device 105b through a network 110. Examples of the electronic devices include, but are not limited to, a computer, a laptop, a mobile device, a handheld device, a personal digital assistant (PDA), and any electronic equipment used in telecommunications. Examples of the network 110 include, but are not limited to, a telecommunication network, a radio network, a local area network (LAN) and a wide area network (WAN).

The electronic device 105a is used for transmitting information through the network 110 to the electronic device 105b. The information, for example a voice information, is transmitted in encrypted form. In an embodiment, the electronic device 105a encrypts information for secure transmission through the network 110. The network 110 performs decryption prior to forwarding the information to the second electronic device 105b. In another embodiment, the network 110 encrypts the information prior to the transmission of the information to the electronic device 110b. The electronic device 105b performs a security synchronization of received information and decrypts the information to ascertain data.

The electronic device 105b includes one or more elements for handling security synchronization. The electronic device 105b including the elements is explained in detail in FIG. 2.

Figure 2:
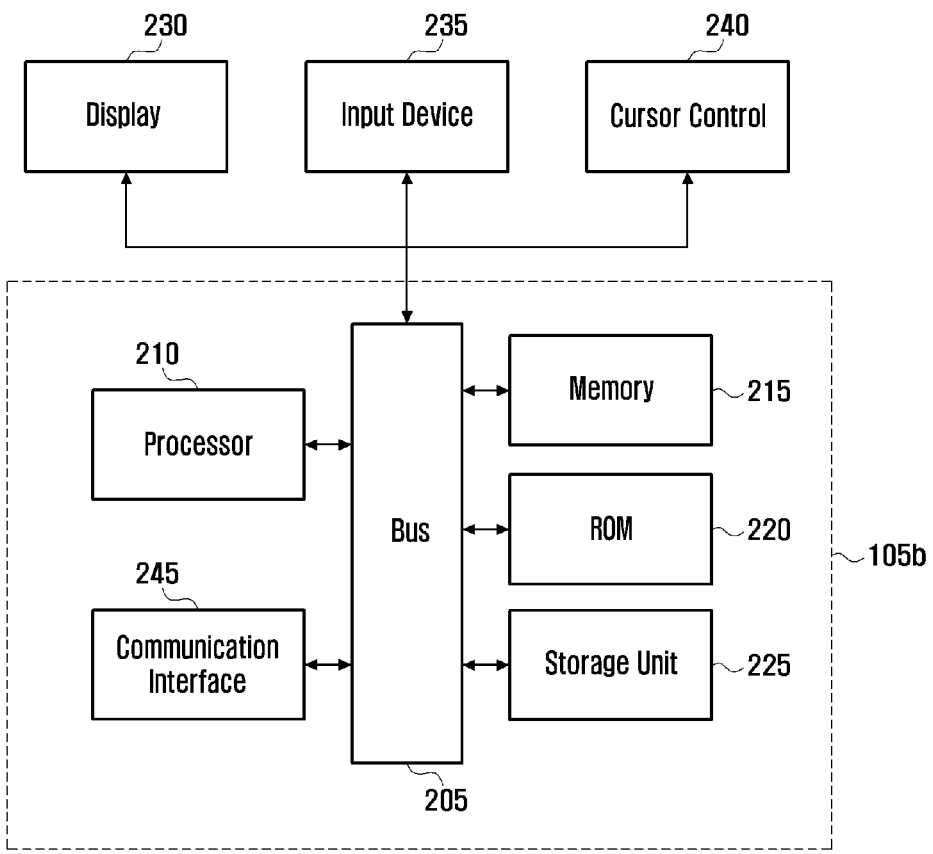
FIG. 2 is a block diagram of a electronic device, in accordance with one embodiment.

FIG. 2 is a block diagram of the electronic device 105b, in accordance with one embodiment. The electronic device 105b includes a bus 205 for communicating information, and a processor 210 coupled to the bus 205 for processing the information. The electronic device 105b also includes a memory 215, for example a random access memory (RAM) coupled to the bus 205 for storing information required by the processor 210. The memory 215 can be used for storing temporary information required by the processor 210. The electronic device 105b can further include a read only memory (ROM) 220 coupled to the bus 205 for storing static information required by the processor 210. A storage unit 225, for example a magnetic disk, a hard disk or an optical disk, can be provided and coupled to the bus 205 for storing the information.

The electronic device 105b can be coupled via the bus 205 to a display 230, for example a cathode ray tube (CRT) or liquid crystal display (LCD), for displaying information. An input device 235, including various keys, is coupled to the bus 205 for communicating information to the processor 210. A cursor control 240, for example a mouse, a trackball, a joystick, or cursor direction keys, used for communicating information to the processor 210 and for controlling cursor movement on the display 230 can also be coupled to the electronic device 105b.

In some embodiments, the steps of the present disclosure are performed by the electronic device 105b using the processor 210. The information can be read into the memory 215 from a machine-readable medium, for example the storage unit 225. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage media. Storage media can include non-volatile media and volatile media. The storage unit 225 can be a non-volatile media. The memory 215 can be a volatile media. All such media must be tangible to enable the instructions carried by the media to be detected by a physical mechanism that reads the instructions into the machine. In an embodiment, the storage medium can include a recovery buffer for storing the one or more protocol data units.

Examples of the machine readable medium include, but are not limited to, a floppy disk, a flexible disk, hard disk, magnetic tape, a CD-ROM, optical disk, punchcards, papertape, a RAM, a PROM, EPROM, and a FLASH-EPROM.

The electronic device 105b also includes a communication interface 245 coupled to the bus 205 for enabling signal and data communication. Examples of the communication interface 245 include, but are not limited to, a zigbee port, or any wireless port specified by Institute of Electrical and Electronics Engineers (IEEE) 802.15.6 task group. The communication interface 245 is operable to receive the one or more protocol data units. The communication interface 245 includes handling one of Universal Mobile Telecommunications System (UMTS), High Speed Packet Access (HSPA), HSPA+, based protocol and radio access protocols.

In some embodiments, the processor 210 can include one or more processing units for performing one or more functions of the processor 210. The processing units are hardware circuitry performing specified functions.

The one or more functions include determining a time period between the receiving of each protocol data unit and a previously received protocol data unit by the radio link control sub layer. The previously received protocol data unit was received immediately before the first protocol data unit among the one or more protocol data units. Similarly, for second protocol data unit received among the one or more protocol data units, the time period corresponds to the time between the receiving of the first protocol data unit and the second protocol data unit by the radio link control sub layer. The one or more functions also include initiating recovery procedure for the time period exceeding a first predefined time. The recovery procedure includes identifying count of the one or ore protocol data units to be recovered. The recovery procedure also includes deciphering each protocol data unit among the one or more protocol data units using a plurality of hyper frame numbers. Further, the recovery procedure includes updating a master hyper frame number based on the deciphering. Further, the one or more functions include delivering the one or more protocol data units to a packet data convergence protocol sub layer. Further, the one or more functions include a type verification of the protocol data unit.

It is noted that the network 110 can include various elements as shown for the electronic device 105b. The functionalities of each element of the electronic device 105b in FIG. 2 can be similar to the network.

Figure 3:
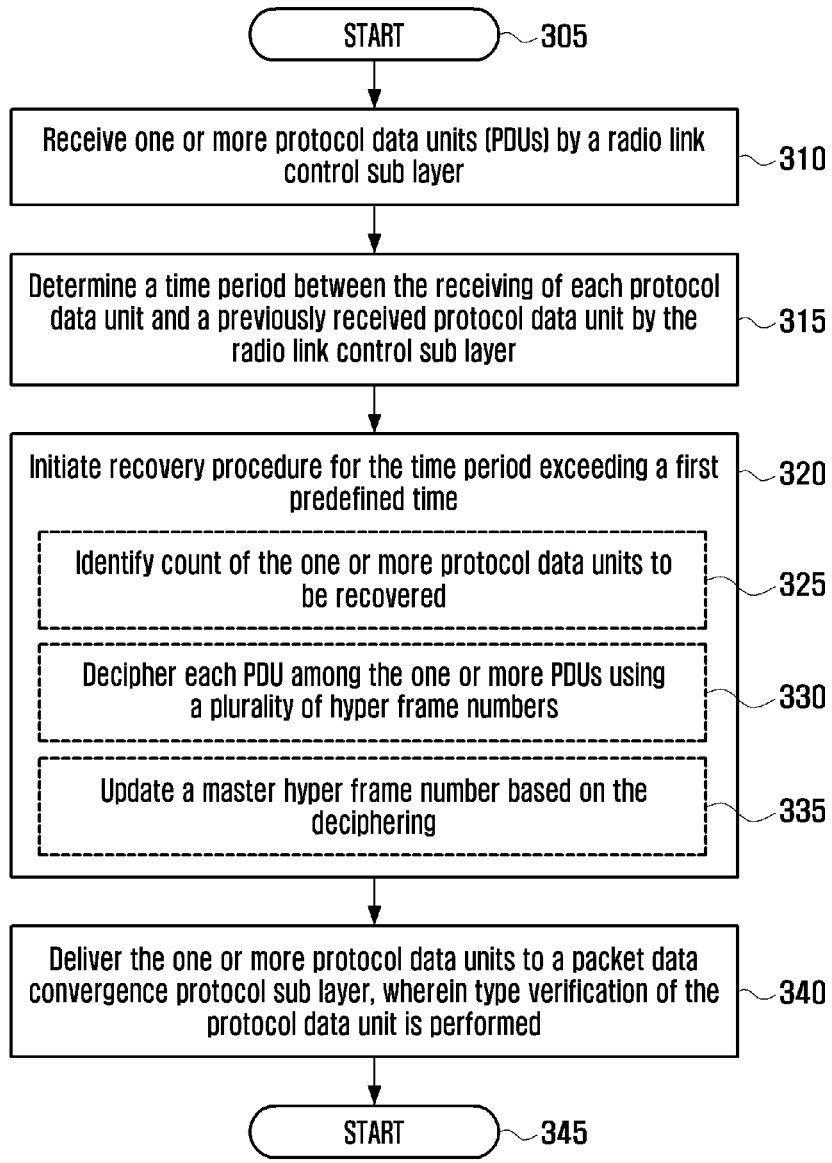
FIG. 3 is a flowchart illustrating a method and system for handling security synchronization for prolonged periods of no-reception of voice frames, in accordance with one embodiment.

FIG. 3 is a flowchart illustrating a method and system for handling security synchronization for prolonged periods of no-reception of voice frames, in accordance with one embodiment.

In an embodiment, one or more radio link control (RLC) protocol data units are transmitted by a first electronic device to a second electronic device through a network. The RLC PDUs are synchronized using a cipher count. In one embodiment, the RLC PDUs are transmitted from the first electronic device to the network. In a second embodiment, the RLC PDUs are transmitted from the network to the second electronic device.

The method starts at step 305.

At step 310, the one or more protocol data units (PDUs) are received by a radio link control sub layer.

In an embodiment, receiving RLC sub layer checks every 20 milli second (ms) for the PDUs.

At step 315, a time period between the receiving of each protocol data unit and a previously received protocol data unit by the radio link control sub layer is determined. The previously received protocol data unit was received immediately before the first protocol data unit among the one or more protocol data units. Similarly, for second protocol data unit received among the one or more protocol data units, the time period corresponds to the time between the receiving of the first protocol data unit and the second protocol data unit by the radio link control sub layer. A protocol variable is increased by a function_floor (time elapsed/141 ms).

The protocol variable, represented as rx_sn_to_be_received, indicates the sequence number of the next PDU expected to be received by the RLC sublayer.

In an embodiment, when time elapsed between consecutive protocol data unit receptions is 'T', the total extension for the period of disambiguity is given by, T*8/7.

Considering that a protocol data unit must be transmitted every 160 ms, the variable rx_sn_to_be_received can be incremented by T*8/7/160=T/140 milliseconds.

The increment must be performed with the next lower integral value. This value is called a function_floor.

The function_floor is a greatest integer function whereby floor(x) is the largest integer not greater than x. However, to eliminate inaccuracy due to approximations a slightly lower value of floor is used. The variable rx_sn_to_be_received is then incremented by function_floor as shown below:

$$rx\_sn\_to\_be\_received\mathrel{+}=\text{Floor}(T/141 \text{ milliseconds})$$

At step 320, a recovery procedure is initiated for the time period exceeding a first predefined time. The first predefined time is the minimum duration after which a recovery becomes necessary. Here, the predefined is 2560 ms.

The PDUs are enqueued to a recovery buffer. The recovery buffer stores the PDUs. The recovery buffered is emptied for the first PDU received.

A limit on the number of PDUs that will be buffered in the recovery buffer known as NMAX_PDUS. The recovery must be attempted when the recovery buffer becomes full i.e. the recovery buffer contains NMAX_PDUS number of PDUs. After first PDU is enqueued in the recovery buffer, if the time duration after the first protocol data unit is transferred to the recovery buffer exceeds a second predefined time then the recovery procedure is initiated. The second predefined time shall be known as TMAX_BUFFER. It is implied that if the first PDU in the recovery buffer was enqueued at time T0, then the recovery shall be attempted at time (T0+TMAX_BUFFER) irrespective of whether the recovery buffer is full or not. The first predefined time is greater in magnitude than the second predefined time. For the recovery procedure, step 325 is performed.

In an embodiment, for the time period less than the first predefined time the PDUs are enqueued to the recovery buffer if a recovery buffer is not empty. If the recovery buffer is empty, the protocol data unit is delivered to a packet data convergence protocol sub layer. A type verification of the protocol data unit is performed prior to delivering of the PDU.

At step 325, count of the one or more protocol data units to be recovered, is identified.

At step 330, each protocol data unit among the one or more protocol data units is deciphered using a plurality of hyper frame numbers. If PDU types do not match for each PDU for a single hyper frame number then updated hyper frame number (count of current attempt for deciphering is added to a master hyper frame number) is used and the one or more PDUs are again deciphered till each PDU among the one or more PDUs match the PDU type. The master hyper frame number is exchanged during an initial set-up of communication between a plurality of electronic devices. An example of the PDU type is given in Table. 2. A limit is maintained on the maximum number of attempts, known as NMAX_ATTEMPTS. The limit implies that if the original HFN used for deciphering the RLC PDU is HFNORIGINAL, then the recovery shall be attempted with all HFN values ranging from HFNORIGINAL to (HFNORIGINAL+NMAX_ATTEMPTS). There shall be a limit on the number of PDUs that will be buffered in the recovery buffer which shall be known as NMAX_PDUs. The original HFN corresponds to the master HFN.

If the one or more PDUs are deciphered using the updated hyper frame number then step 335 is performed. Here, the master HFN is updated.

At step 335, the master hyper frame number is updated based on the deciphering. The master hyper frame number deciphers each protocol data unit among the one or more protocol data units.

In an embodiment, the master hyper frame number is used for deciphering next set of PDUs received by the second electronic device.

At step 340, the one or more protocol data units are delivered to a packet data convergence protocol sub layer. Here, a type verification of the protocol data unit is performed.

The PDCP PDU format for AMR Data PDU is shown in Table. 1. The value of the field 'PDU type' is '010' for AMR Data PDU. The same format and value are used for all subtypes of AMR PDUs namely, normal audio, SID First and SID Update.

Table. 1 illustrates a format for PDCP AMR Data PDU.

TABLE 1

| PDU type | CS counter |
|---|---|
| Data | |

Table. 2 described standard values of the PDU type field for PDCP AMR Data PDU.

TABLE 2

| Bit | PDU Type |
|---|---|
| 000 | PDCP Data PDU |
| 001 | PDCP SeqNum PDU |
| 010 | PDCP AMR Data PDU |
| 011-111 | Reserved (PDUs with this encoding are invalid for this version of the protocol) |

Since the first 3 bits of the PDCP PDU header are known to be the same, it is possible to verify if a received PDU has been correctly deciphered. If the first 3 bits of a received PDCP PDU do not match with the value of the field 'PDU type' is '010' for AMR Data PDU, it can be concluded that the RLC PDU has not been deciphered correctly.

The method of security synchronization for prolonged periods of no-reception of voice frames is explained in detail in conjunction with FIG. 4-FIG. 7.

The method stops at step 345.

Table. 3 is an exemplary value for few parameters in an embodiment.

TABLE 3

| $T_{MIN\_RECOVERY}$ | $N_{MAX\_PDUS}$ | $N_{MAX\_ATTEMPTS}$ | $T_{MAX\_BUFFER}$ |
|---|---|---|---|
| 2560 ms | 4 | 2 | 100 ms |

Figure 4:
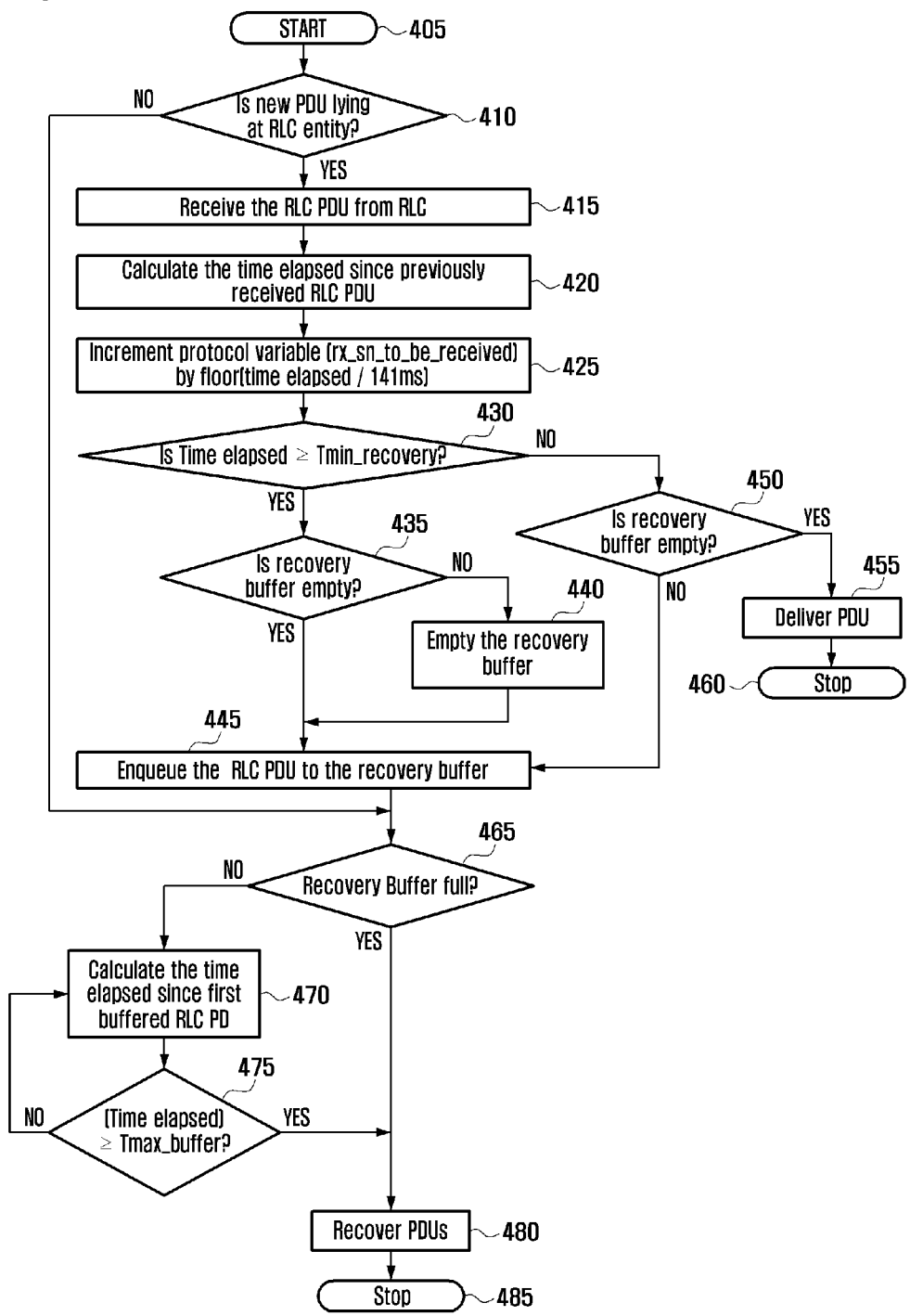
FIG. 4 is a flowchart illustrating a method for security synchronization of voice frames, in accordance with one embodiment.

FIG. 4 is a flowchart illustrating a method for security synchronization of voice frames, in accordance with one embodiment.

The radio link control (RLC) sub layer at a first electronic device generates a set of data units called RLC-protocol data units (PDUs) and transfers these PDUs across the network to a second electronic device. The receiving electronic device performs synchronization of received PDUs and deciphers the received RLC PDUs.

At step 405, the method starts.

At step 410, a RLC sub layer at the second electronic device checks to see if a new PDU is received.

If the new PDU is received then step 415 is performed. If the new PDU is not received, then step 465 is performed.

At step 415, the RLC sublayer receives the new PDU.

At step 420, time elapsed since previously received radio link control-protocol data unit is determined.

At step 425, a protocol variable (rx_sn_to_be_received) is incremented by a factor called a function floor (T/141 ms).

The protocol variable rx_sn_to_be_received indicates the sequence number of the next PDU to be received by the RLC sublayer.

In an embodiment, when time elapsed between consecutive protocol data unit receptions is 'T', the total extension for the period of disambiguity is given by, T*8/7.

Considering that a protocol data unit must be transmitted every 160 ms, the variable rx_sn_to_be_received can be incremented by T*8/7/160=T/140 milliseconds.

The increment must be performed with the next lower integral value. This value is called function_floor.

The function_floor is a greatest integer function whereby floor(x) is the largest integer not greater than x. However, to eliminate inaccuracy due to approximations a slightly lower value of floor is used. The variable rx_sn_to_be_received is then incremented by function_floor as shown below:

rx_sn_to_be_received+=Floor (T/141 milliseconds)

At step 430, the RLC sublayer checks to determine if the time elapsed since the last received protocol data unit is greater than a Tmin_recovery. The Tmin_recovery is the minimum period after which recovery of protocol data units becomes necessary.

If the time elapsed is greater than Tmin_recovery, then step 435 is performed. If the time elapsed is not greater than Tmin_recovery, then step 450 is performed.

At step 435, the status of the recovery buffer is checked.

The recovery buffer is used for storing one or more protocol data units.

If the recovery buffer is empty, step 445 is performed. If the recovery buffer is not empty, then step 440 is performed.

At step 440, the recovery buffer is emptied. After step 440, the step 445 is performed.

At step 445, the RLC-PDUs are queued in the recovery buffer. After step 445, step 465 is performed.

At step 450, the status of a buffer, called the recovery buffer, is checked.

If the recovery buffer is empty, then step 455 is performed. If the recovery buffer is not empty, then step 445 is performed.

At step 455, the PDUs are delivered to the next layer. The next layer is the PDCP layer. In an embodiment, type field for the PDUs are verified prior to the delivery of the PDUs to the next layer.

At step 460, the method stops.

At the step 465, the status of the recovery buffer is checked.

If the recovery buffer is full, then step 485 is performed. If the recovery buffer is not full, step 470 is performed.

At step 470, the time elapsed since the first radio link control-protocol data unit is buffered is determined.

At step 475, the RLC sublayer checks if the time elapsed is greater than Tmax_buffer, Tmax_buffer is the maximum duration for which a protocol data unit can be buffered before recovery is attempted.

If the time elapsed is greater than Tmax_buffer then step 480 is performed. If the time elapsed is not greater than Tmax_buffer then step 475 is performed after a predefined delay. In an embodiment, the step 475 is performed every 20 ms.

At step 480, the PDUs in the recovery buffer are recovered.

At step 485, the method stops.

Figure 5:
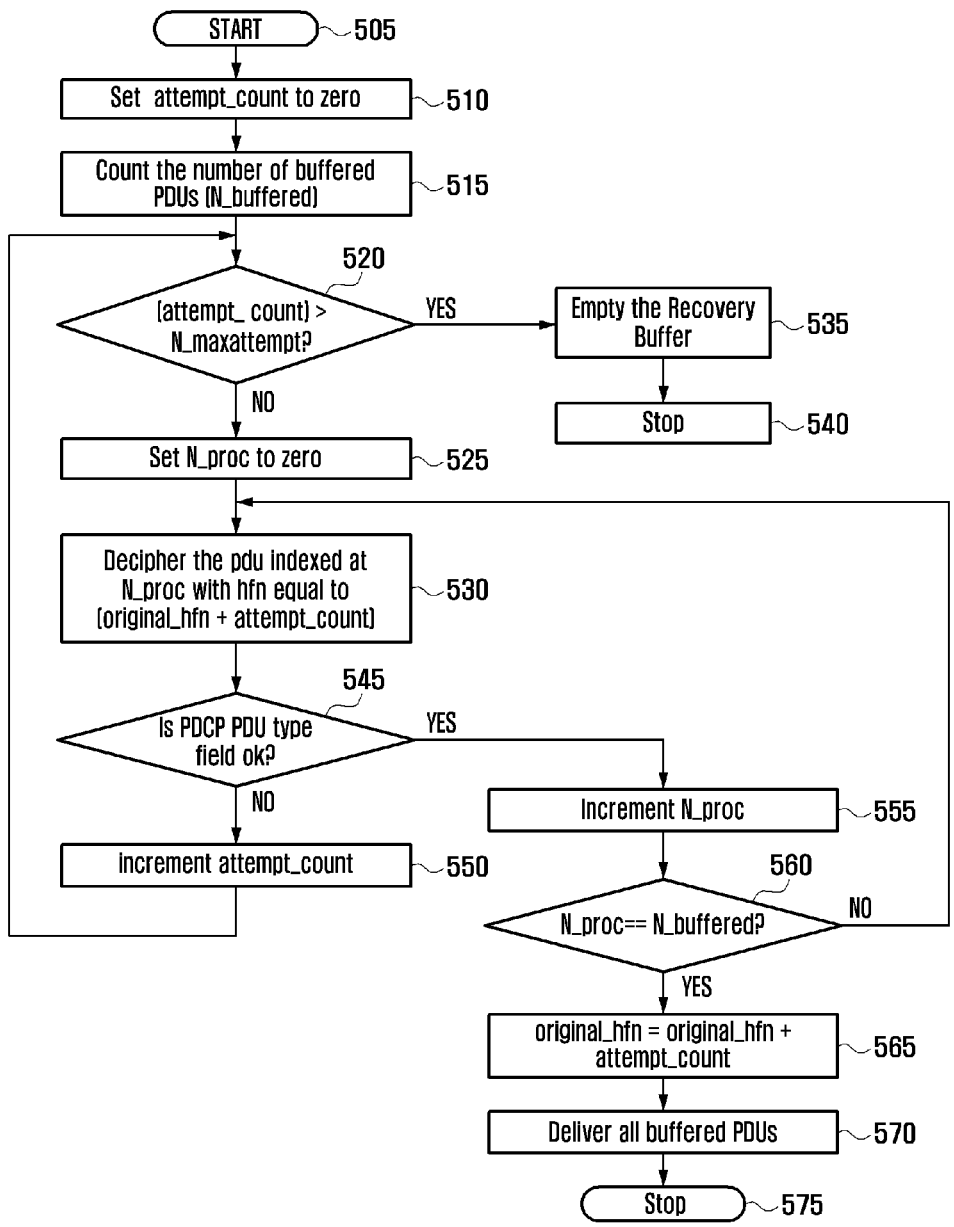
FIG. 5 is a flowchart illustrating a method for recovery procedure from deciphering failure, in accordance with one embodiment.

The method by which the protocol data units are recovered is explained in conjunction with FIG. 5.

FIG. 5 is a flowchart illustrating a method for recovery procedure from deciphering failure, in accordance with one embodiment.

At step 505, the method to recovery protocol data units (PDUs) starts.

A master hyper frame number is exchanged during an initial set-up of communication between a plurality of electronic devices. Here, the hyper frame number is defined as 'Original_hfn'.

At step 510, set a count for recovery attempt to zero.

At step 515, the number of buffered protocol data units to be held in the buffer is determined and assigned to variable N_buffered.

At step 520, the radio link control (RLC) sublayer checks if attempt_count is greater than N_maxattempt.

The N_maxattempt is a limit on the number of attempts for recovery.

If the attempt_count is greater than N_maxattempt, then step 535 is performed. If the attempt_count is lesser than N_maxattempt then step 525 is performed.

At step 525, the variable N_proc is set to zero.

The N_proc is the variable assigned to the PDU being processed by the RLC sublayer.

At step 530, the protocol data unit indexed at N_proc is deciphered with the hyper frame number (hfn) equal to original_hfn+attempt_count.

Original_hfn is a variable assigned to the first hyper frame number used in calculations prior to incrementing of the hyper frame number. The original_hfn is determined during initial communication set-up. After step 530, step 545 is performed.

At step 535, the recovery buffer is emptied.

At step 540, the method stops.

At step 545, the radio link control sublayer checks if packet data convergence protocol-protocol data unit has correct 'PDU type' field.

If the 'PDU type' field in the protocol data unit is correct, then step 555 is performed. If the 'PDU type' field is wrong, then step 550 is performed.

At step 550, the variable attempt_count is incremented.

At step 555, N_proc is incremented to hold the value of the next protocol data unit being processed.

At step 560, the radio link control sublayer checks if N_proc is equal to N_buffered.

If the protocol data unit being processed, N_proc is not equal to the count of protocol data units in the buffer, N_buffered, then step 530 is performed.

If the protocol data unit being processed, N_proc is equal to the count of protocol data units in the buffer, N_buffered, then step 565 is performed.

At step 565, the variable holding original hyper frame number, original_hfn, is incremented with the variable holding the count of attempts, attempt_count.

In an embodiment, the original_hfn incremented with the variable attempt_count is used for deciphering next set of PDUs that are received.

At step 570, all the buffered protocol data units are delivered to the next layer.

In an embodiment, if one or more protocol data units in the recovery buffer are associated with same hyper frame number then the method described in FIG. 5 is performed. If the one or more protocol data units in the recovery buffer are associated with different hyper frame numbers then at the step 530, consecutive PDUs are deciphered using different hyper frame numbers. For example, if PDUs are 126, 127, 0 and 1 and the HFN is x then, (126, 127) are deciphered using x and (0, 1) are deciphered using x+1.

Figure 6:
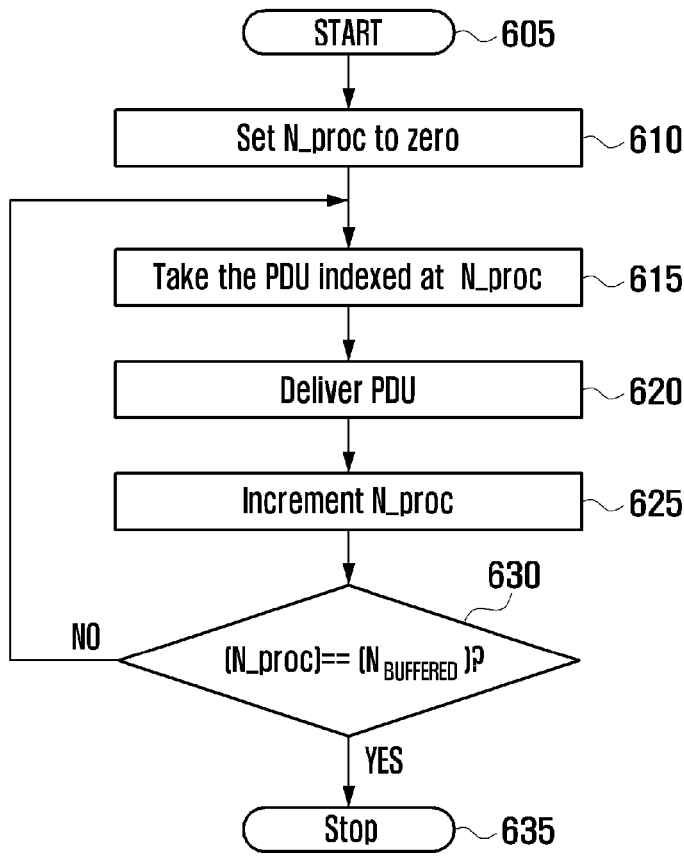
FIG. 6 is a flowchart illustrating a method for delivering multiple protocol data units present in the recovery buffer, in accordance with one embodiment.
Figure 7:
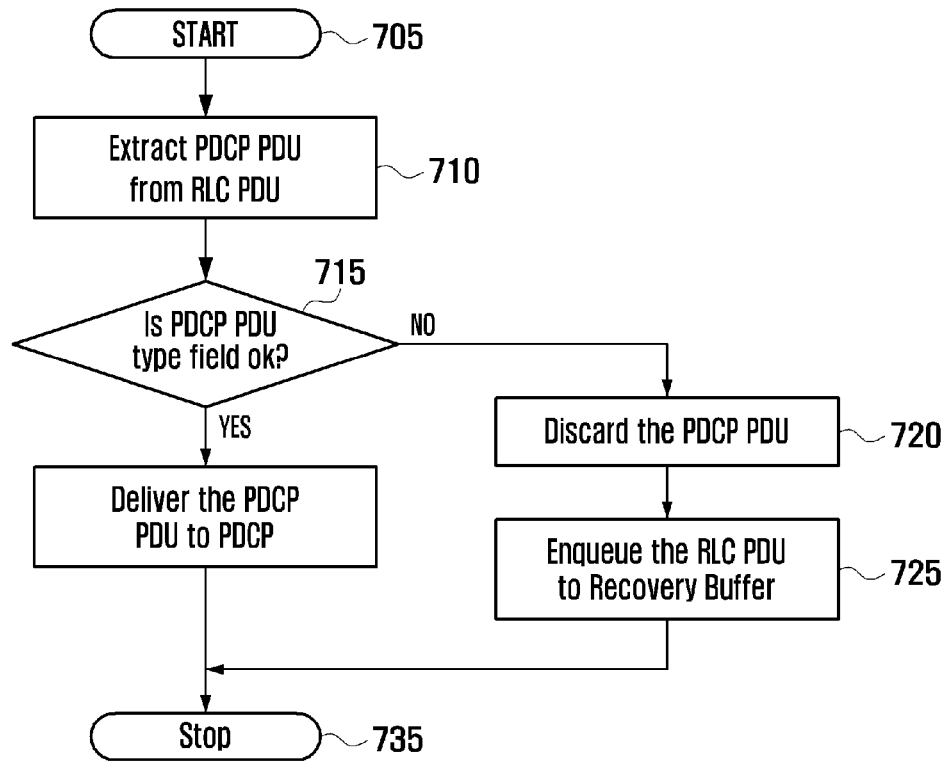
FIG. 7 is a flowchart illustrating a method for delivering a single protocol data unit, in accordance with an embodiment.

The delivery of all the buffered protocol data units is explained in conjunction with FIG. 6 and FIG. 7.

At step 575, the method stops.

FIG. 6 is a flowchart illustrating a method for delivering multiple protocol data units present in the recovery buffer, in accordance with one embodiment.

At step 605, the method starts.

At step 610, N_proc is set to zero.

N_proc is the variable assigned to the protocol data unit being processed by the radio link control sublayer.

At step 615, the protocol data unit indexed at N_proc is queued for delivery.

At step 620, the protocol data unit is delivered.

The method of delivery of a protocol data unit is explained in conjunction with FIG. 7.

At step 625, N_proc is incremented.

At step 630, the radio link control sublayer checks if indexed protocol data unit, N_proc, is compared for equality with the number of protocol data units that can be held in buffer, N_buffered.

If the equality check fails, then step 615 is performed.

If equality check succeeds, then step 635 is performed.

At step 635, the method stops.

FIG. 7 is a flowchart illustrating a method for delivering a single protocol data unit, in accordance with an embodiment.

At step 705, the method for delivering a protocol data unit begins.

At step 710, the packet data convergence protocol-protocol data unit is extracted from the received radio link control-protocol data unit.

At step 715, the radio link control sublayer checks if the packet data convergence protocol-protocol data unit type field is correct.

If the packet data convergence protocol-protocol data unit type field is correct, step 730 is performed.

If the packet data convergence protocol-protocol data unit type field is incorrect, step 720 is performed.

At step 720, the packet data convergence protocol-protocol data unit is discarded.

At step 725, the radio link control-protocol data unit is enqueued in the recovery buffer.

At step 730, the packet data convergence protocol-protocol data unit is delivered to the packet data convergence protocol layer.

At step 735, the method stops.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

The invention claimed is:

1. A method comprising:
   receiving one or more protocol data units by a radio link control sub layer;
   determining a time period between the receiving of each protocol data unit and a previously received protocol data unit by the radio link control sub layer;
   initiating a recovery procedure for the time period exceeding a first predefined time, the initiating comprising:
      identifying a count of the one or more protocol data units to be recovered;
      deciphering each protocol data unit among the one or more protocol data units using a plurality of hyper frame numbers; and
      updating a master hyper frame number based on the deciphering; and
   delivering the one or more protocol data units to a packet data convergence protocol sub layer, wherein a type verification of the protocol data unit is performed.

2. The method of claim 1, wherein a protocol variable in the protocol data unit is increased by a function.

3. The method of claim 2, wherein the function corresponds to a floor (time period/141 ms).

4. The method of claim 1, wherein the initiating of the recovery procedure further comprises:
   transferring the protocol data unit to a recovery buffer; and
   performing the recovery procedure if the time duration after the protocol data unit is transferred to the recovery buffer exceeds a second predefined time.

5. The method of claim 4, wherein the protocol data unit is queued if the recovery buffer comprises the one or more protocol data units.

6. The method of claim 5 further comprising:
   performing the recovery procedure for the one or more protocol data units if the recovery buffer exceeds a buffer limit.

7. The method of claim 1 further comprising one of:
   initiating the recovery procedure for the time period less than the first predefined time; and
   delivering the protocol data unit to the packet data convergence protocol sub layer, wherein the type verification of the protocol data unit is performed.

8. The method of claim 4, wherein the first predefined time is greater in magnitude than the second predefined time.

9. The method of claim 1, wherein the deciphering comprises:
   performing the type verification of the one or more protocol data units.

10. The method of claim 1, wherein the one or more protocol data units are deciphered using the master hyper frame number.

11. An apparatus comprising:
    a communication interface configured to receive one or more protocol data units by a radio link control sub layer; and
    a controller configured to determine a time period between the receiving of each protocol data unit and a previously received protocol data unit by the radio link control sub layer, to initiate a recovery procedure for the time period exceeding a first predefined time, to identify a count of the one or more protocol data units to be recovered, to decipher each protocol data unit among the one or more protocol data units using a plurality of hyper frame numbers, to update a master hyper frame number based on the deciphering, and to deliver the one or more protocol data units to a packet data convergence protocol sub layer, wherein a type verification of the protocol data unit is performed.

12. The apparatus of claim 11, wherein a protocol variable in the protocol data unit is increased by a function.

13. The apparatus of claim 12, wherein the function corresponds to a floor (time period/141 ms).

14. The apparatus of claim 11, wherein the controller is further configured to transfer the protocol data unit to a recovery buffer, and to perform the recovery procedure if the time duration after the protocol data unit is transferred to the recovery buffer exceeds a second predefined time.

15. The apparatus of claim 14, wherein the protocol data unit is queued if the recovery buffer comprises the one or more protocol data units.

16. The apparatus of claim 15, where the controller is further configured to perform the recovery procedure for the one or more protocol data units if the recovery buffer exceeds a buffer limit.

17. The apparatus of claim 11, wherein the controller is further configured to initiate the recovery procedure for the time period less than the first predefined time, and to deliver the protocol data unit to the packet data convergence protocol sub layer, wherein the type verification of the protocol data unit is performed.

18. The apparatus of claim 14, wherein the first predefined time is greater in magnitude than the second predefined time.

19. The apparatus of claim 11, wherein the controller is configured to perform the type verification of the one or more protocol data units.

20. The apparatus of claim 11, wherein the one or more protocol data units are deciphered using the master hyper frame number.

* * * * *